(12) United States Patent
von der Ahe et al.

(10) Patent No.: US 7,735,070 B2
(45) Date of Patent: Jun. 8, 2010

(54) ALLOWING NON-GENERIFIED METHODS TO OVERRIDE GENERIFIED METHODS

(75) Inventors: Peter von der Ahe, Mountain View, CA (US); Gilad Bracha, Los Altos, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1210 days.

(21) Appl. No.: 11/174,073

(22) Filed: Jun. 30, 2005

(65) Prior Publication Data

US 2007/0006138 A1 Jan. 4, 2007

(51) Int. Cl.
G06F 9/45 (2006.01)
G06F 9/44 (2006.01)

(52) U.S. Cl. .................. 717/140; 717/116; 717/118

(58) Field of Classification Search ............ 717/108, 717/114, 116, 118, 140, 165; 719/315, 332
See application file for complete search history.

(56) References Cited

U.S. PATENT DOCUMENTS

| | | | |
|---|---|---|---|
| 5,737,607 A | | 4/1998 | Hamilton et al. |
| 6,018,628 A | * | 1/2000 | Stoutamire .................. 717/147 |
| 6,725,280 B1 | * | 4/2004 | Bracha ........................ 719/315 |
| 7,152,223 B1 | * | 12/2006 | Brumme et al. ............. 717/116 |
| 7,316,010 B1 | * | 1/2008 | Daynes et al. .............. 717/140 |
| 2004/0216094 A1 | | 10/2004 | Bosworth et al. |
| 2006/0236315 A1 | * | 10/2006 | Bracha ........................ 717/168 |

OTHER PUBLICATIONS

Gilad Bracha, Martin Odersky, David Stoutamire, Philip Wadler, "GJ Specification", May 1998.*
Gilad Bracha, Martin Odersky, David Stoutamire, Philip Wadler, "Making the future safe for the past: Adding Genericity to the Java Programming Language", Submitted to OOPSLA98, 1998.*
Tim Lindholm and Frank Yellin, "The Java Virtual Machine Specification", Chapter 2, Sun Microsystems Inc., 1999.*
James Gosling, Bill Joy, and Guy Steele, "The Java Language Specification, 2nd Edition", Chapter 8, Sun Microsystems Inc., 1996.*
Sun Microsystems Inc., "The Java.TM Tutorial: Overriding Methods", Feb. 1, 2003.*
European Patent Office, "European Search Report", Foreign Application No. EP 06 25 3209, Received Jan. 16, 2008, 5 pages.
Claims, Foreign Application No. EP 06 25 3209, 7 pages.

(Continued)

*Primary Examiner*—Chat C Do
*Assistant Examiner*—Matthew Sandifer
(74) *Attorney, Agent, or Firm*—Osha • Liang LLP

(57) ABSTRACT

In accordance with one embodiment of the present invention, there is provided a technique for allowing a first method to override a second method as long as specified criteria are satisfied, even if the types of the parameters of the first method differ from the types of the parameters of the second method, and even if the return type of the first method differs from the return type of the second method. As a result of the technique, older methods, which do not have generic return types and/or generically typed parameters, can continue to override methods that did not used to have generic return types and/or generically typed parameters, but now do.

15 Claims, 3 Drawing Sheets

OTHER PUBLICATIONS

Gosling et al., "The Java Language Specification- Third Edition (Chapter 8)", XP-002461538, ISBN: 0-321-24678-0, Addison-Wesley, May 2005, 120 pages.

Bracha, Gilad, "Generics in the Java Programming Language," [online], Jul. 5, 2004, [retrieved on Jun. 14, 2005]. Retrieved from the Internet: <http://java.sun.com/j2se/1.5/pdf/generics-tutorial.pdf>, pp. 1-23.

Wikström, Ake, "Functional Programming Using Standard ML," 1987, Prentice Hall International Series in Computer Science, XP002400699, pp. 56-57, pp. 97-98 (Section 8.1.4), p. 103 (Summary), p. 143 (Patterns with Type Constraint, p. 142.

European Patent Office, "European Search Report," App. No. 06252016.8, dated Oct. 16, 2006, 6 pages.

Claims, App. No. 06252016.8, 7 pages [attached].

* cited by examiner

ALLOWING NON-GENERIFIED METHODS TO OVERRIDE GENERIFIED METHODS

BACKGROUND

Generic Types

Java™ Development Kit (JDK) is a software development kit for producing Java™ programs. JDK version 1.5 introduced several extensions to the Java™ programming language (referred to as "Java™" herein). One of these extensions is the introduction of "generic types."

Generic types in Java™ are analogous to, but not exactly the same as, templates in the C++ programming language. Generic types may be most easily understood through a discussion of the scenarios that make the use of generic types beneficial.

According to the syntactical rules of strongly typed programming languages such as Java™, the data type of a variable is supposed to be expressed in the declaration of that variable. The following declaration is illustrative:

Integer x=new Integer(0);

In the above declaration, the variable "x" is declared to be of type "Integer." Thus, any attempt to assign, to "x," an object that is not an instance of the "Integer" class or a subclass thereof, should be forbidden and should cause the compiler to alert the programmer that something is amiss in the assignment.

The following declaration is somewhat more sophisticated and informative:

List myIntList=new LinkedList( );

In the above declaration, the variable "myIntList" is declared to be of type "List." When the above expression is evaluated, a new instance of the "LinkedList" class (i.e., a "LinkedList" object) is created ("instantiated") via the invocation of the "LinkedList( )" constructor method and assigned to "myIntList." The "List" and "LinkedList" classes are used as examples in the discussion below, but it should be understood that the behaviors of the classes discussed below are not limited only to these classes.

A variable of a particular type can be assigned objects that are of subtypes of that particular type. Like other variables of type "List," the variable "myIntList" can be assigned "LinkedList" objects, because type "LinkedList" is a subtype of type "List." The "LinkedList" object is a linked list of other objects. Prior to the introduction of generic types in Java™, the compiler could not determine what the specific types of these other objects were. The type system is a conservative approximation of run-time behavior. For example, without generic types, if "Foo"-type objects were "inserted" into a LinkedList, then the compiler could not determine, upon "extraction" of these objects from the LinkedList, that the objects were of type "Foo." Without generic types, the compiler merely could determine that these objects were instances of some indeterminable subtype of the "Object" class; in Java™, all classes are subclasses of the "Object" class. Because this was as specific as the compiler could get, the "extracted" objects could only have the methods of the "Object" class (as opposed to the "Foo" class) invoked relative to them.

Because of this shortcoming, it often became necessary for a programmer to "cast" such a returned object into a particular data type prior to assigning that object to a variable that was declared to be of the particular data type. The following code is demonstrative:

Integer x=(Integer)myIntList.iterator( ).next( );

In the above code, the "Object" type object returned by the method is expressly cast into an instance of class "Integer." If this cast were not performed, then the compiler might complain that a non-"Integer" type object was being assigned to a variable of type "Integer." Indeed, such a complaint would be beneficial, because if the compiler did not complain about such an assignment, then the compiled program might exhibit unexpected and unwanted behavior if and when the method returned an object that actually was not an Integer.

Having to cast objects in this manner usually irritates programmers and makes source code undesirably verbose and less readable. Some might even consider casting to be a "dirty" programming practice. Fortunately, the advent of generic types in Java™ made casting unnecessary, at least for the purposes discussed above. A sample declaration that incorporates generic types follows:

List<Integer>myIntList=new LinkedList<Integer>( );

This is similar to the non-generically typed declaration above, except that the declaration expressly indicates that the objects within the Linked List assigned to "myIntList" are going to be instances of class "Integer." In light of the declaration, the compiler knows that every object returned by the "myIntList.iterator( ).next( )" method is an "Integer" object. The compiler will not complain about the expression Integer x=myIntList.iterator( ).next( );

because the compiler can determine that the object returned by the method must be an "Integer" object, and that variable "x" can reference objects of type "Integer." A single declaration makes potentially many casts unnecessary.

It also should be noted that generic types allow for specificity in this manner without requiring multiple separate implementations of the class. Although "myIntList" is a "List" object that references "Integer" objects, it was not necessary for the programmer to specifically code an implementation of the "List" class to reference only "Integer" objects. Generic types allow a class to be defined once in a generic manner, and then invoked multiple times in different specific declarations.

Due to the more precise approximation of run-time behavior that generic types provide, generic types also help to avoid runtime failures.

An actual example of generic type declarations is shown below:

```
public interface List<E> {
    void add(E x);
    Iterator<E> iterator( );
}
public interface Iterator<E> {
    E next( );
    boolean hasNext( );
}
```

In the above generic type declarations, the angle bracket-enclosed parameters (e.g., "<E>") are called the "formal type parameters" of the generic types. The specific invocation of such a generic type is called a "parameterized type." For example, the following expression is a parameterized type:

List<Integer>

In the foregoing parameterized type, "<Integer>" is an example of an "actual type argument." Parameterized types specify actual type arguments that are to be put in the place of formal type parameters when the generic type declaration is invoked.

Although Java™ generic types and C++ templates are somewhat similar syntactically and functionally, there are some significant differences between the two. The declaration of a Java™ generic type is not expanded, either within source code or within binary code, into multiple different specific declarations for different actual type arguments. Instead, much like with non-generic type declarations in Java™, a Java™ generic type declaration is compiled into a single class file.

Because generic types are so useful, many of the non-generic type declarations that used to exist in the Java™ libraries have been replaced with generic type declarations. Non-generic method declarations also have been replaced in these libraries with generic method declarations. In other words, the former non-generic type and method declarations have been "generified." Programmers who are writing new Java™ programs can make use of the generic types and methods by putting parameterized types in their programs.

Raw Types and Erasure

Because the Java™ language has already been in existence for a significant period of time, many Java™ programs already have been written. As can be imagined, many of these programs do not contain parameterized types. Instead, many of these programs contain invocations that do not specify an actual type argument. If the compiler required every invocation of a generic type declaration to be a parameterized type (as opposed to an invocation that did not specify an actual type argument), then many of the existing Java™ programs would be incompatible with the new Java™ libraries.

One attempt to solve the above problem would be to require existing Java™ programs to be modified so that every invocation of a generic type declaration specified an actual type argument for each formal type parameter in the generic type declaration. Modifying very large programs in this manner would be an onerous task—so onerous, in fact, that programmers might prefer instead to forego entirely the use of the new Java™ libraries and generic type mechanisms.

Another approach to solving the above problem involves implementing the compiler in such a way that the compiler permits programs to contain invocations of generic type declarations even if those invocations do not specify actual type arguments for the formal type parameters in the generic type declarations. A generic type invocation that does not specify actual type arguments for the formal type parameters in the generic type declaration is called a "raw type" (in contrast to a "parameterized type," which does specify such actual type arguments). When a compiler encounters an expression that refers to a raw type, the compiler warns that the correctness of the expression cannot be guaranteed; the compiler cannot perform type checking with respect to the raw type. Nevertheless, the compiler allows compilation to proceed. The burden is placed on the programmer to ensure that the expression does not cause undesirable effects at run time.

In order to preserve backward compatibility, when a Java™ program is compiled, the actual type arguments that are specified in parameterized types are not preserved in the resulting binary file; such arguments are lost in a process called "erasure." Although not necessarily its sole purpose, erasure allows programs that contain raw types to interoperate with libraries that contain generic type declarations, as described above. Through erasure, the binary representation of an instance of a parameterized type becomes identical to the binary representation of an instance of the corresponding raw type. Because these binary representations are identical, old binary files, which were compiled from programs that contained raw types, can be linked with new binary files, which were compiled from libraries that contained generic type declarations.

Inheritance and Overriding

Inheritance is a major property of most object oriented programming systems. With inheritance, when a class is declared as a subclass of a superclass, that subclass automatically inherits all of the methods and attributes of the superclass. Thus, if class A has method M1 and attribute AT1, then class B, which is a subclass of class A, automatically inherits method M1 and attribute AT1. In addition to inheriting the methods and attributes of the superclass, the subclass may further comprise additional methods and attributes. Thus, for the example given above, class B may further comprise methods M2 and M3, and attributes AT2 and AT3.

In addition to inheriting and adding methods and attributes, some object-oriented systems further allow subclasses to override the methods of the superclass. That is, the subclass is allowed to provide an implementation for an inherited method which is different from that provided by the superclass. This means that, for the example given above, subclass B may provide a different implementation for method M1 than that provided by superclass A. For example, the implementation for M1 provided by superclass A may draw a square whereas the implementation for method M1 provided by subclass B draws a circle. Thus, even though both methods have the same name, they may have different implementations. Which implementation is invoked depends upon the class of the object instance on which the method is invoked. If the method is invoked on a class A instance, then the implementation provided by class A will be invoked. If the method is invoked on a class B instance, then the implementation provided by class B will be invoked. Because there may be multiple implementations for any particular method, a determination will have to be made at runtime as to which implementation to invoke. The process of selecting which implementation to invoke at runtime is referred to as dynamic method dispatch.

Currently, if method M1 in subclass B has the same name and signature as method M1 in superclass A, then the Java™ compiler determines that class B is attempting to override method M1 (signatures are discussed in greater detail below). If the names and signatures of the methods are the same, but the types of the parameters of the methods are different, then the compiler regards M1 in subclass B as being a method that is separate from M1 in superclass A; the compiler concludes that no override attempt is being made. The following examples are illustrative:

```
class CollectionConverter {
    List toList(Collection c) { ... }
}
class Overrider extends CollectionConverter {
    List toList(Collection c) { ... }
}
```

In the above example, neither class is generic, nor are the types of the parameters of the methods thereof. The types of the parameters of both "toList( )" methods are identical ("Collection"). Therefore, the compiler allows subclass "Overrider" to override the "toList( )" method.

Sometime after the above classes have been written and used extensively in programs, the author of the "CollectionConverter" class might wish to make use of the improved generic type mechanisms. Thus, the author might at least partially generify the declaration of the "CollectionConverter" class to be as follows:

```
Class CollectionConverter {
    <T> List<T> toList(Collection<T> c) { ... }
}
```

After the class has been modified, the code containing the class needs to be recompiled for the modification to have any effect. The name of method "toList( )" in the new version of superclass "CollectionConverter" is the same as the name of method "toList( )" in subclass "Overrider." However, the types of the parameters of method "toList( )" in subclass "Overrider" do not match the types of the parameters of method "toList( )" in superclass "CollectionConverter;" type "Collection" is not the same as type "Collection<T>." Therefore, the compiler does not conclude that subclass "Overrider" is attempting to override the "toList( )" method. The code containing subclass "Overrider" might behave erratically when compiled, even though the code might have behaved correctly prior to the modification of superclass "CollectionConverter."

Many existing non-generic subclasses may override methods of an existing non-generic superclass. An author of such a non-generic superclass may be reluctant to generify the methods of the superclass because generifying the methods of the superclass may prevent the compilation of existing code that contains subclasses of the superclass. Often, the author of the superclass has no control or even awareness of the code that contains a subclass that overrides methods of the superclass; for example, if the superclass is in a library that is distributed to others, then the author of the superclass might not be able to generify both the methods of the superclass and all of the methods of the subclasses that inherit from the superclass.

In order to promote the adoption of generic types, techniques are needed for allowing non-generic subclasses with non-generic methods to override methods that have parameters that are of generic types.

SUMMARY

In accordance with one embodiment of the present invention, there is provided a technique for allowing a first method to override a second method as long as specified criteria are satisfied, even if the types of the parameters of the first method differ from the types of the parameters of the second method, and even if the return type of the first method differs from the return type of the second method. As a result of the technique, older methods, which do not have generic return types and/or generically typed parameters, can continue to override methods that did not used to have generic return types and/or generically typed parameters, but now do.

According to one embodiment of the invention, the specified criteria, referred to above, include the criterion that either the "signatures" of the putative overriding method and the putative overridden method are the same, or the erasure of the signature of the putative overridden method is the same as the signature of the putative overriding method. Signatures are discussed in greater detail below.

DETAILED DESCRIPTION OF EMBODIMENT(S)

Overview

Figure 1:
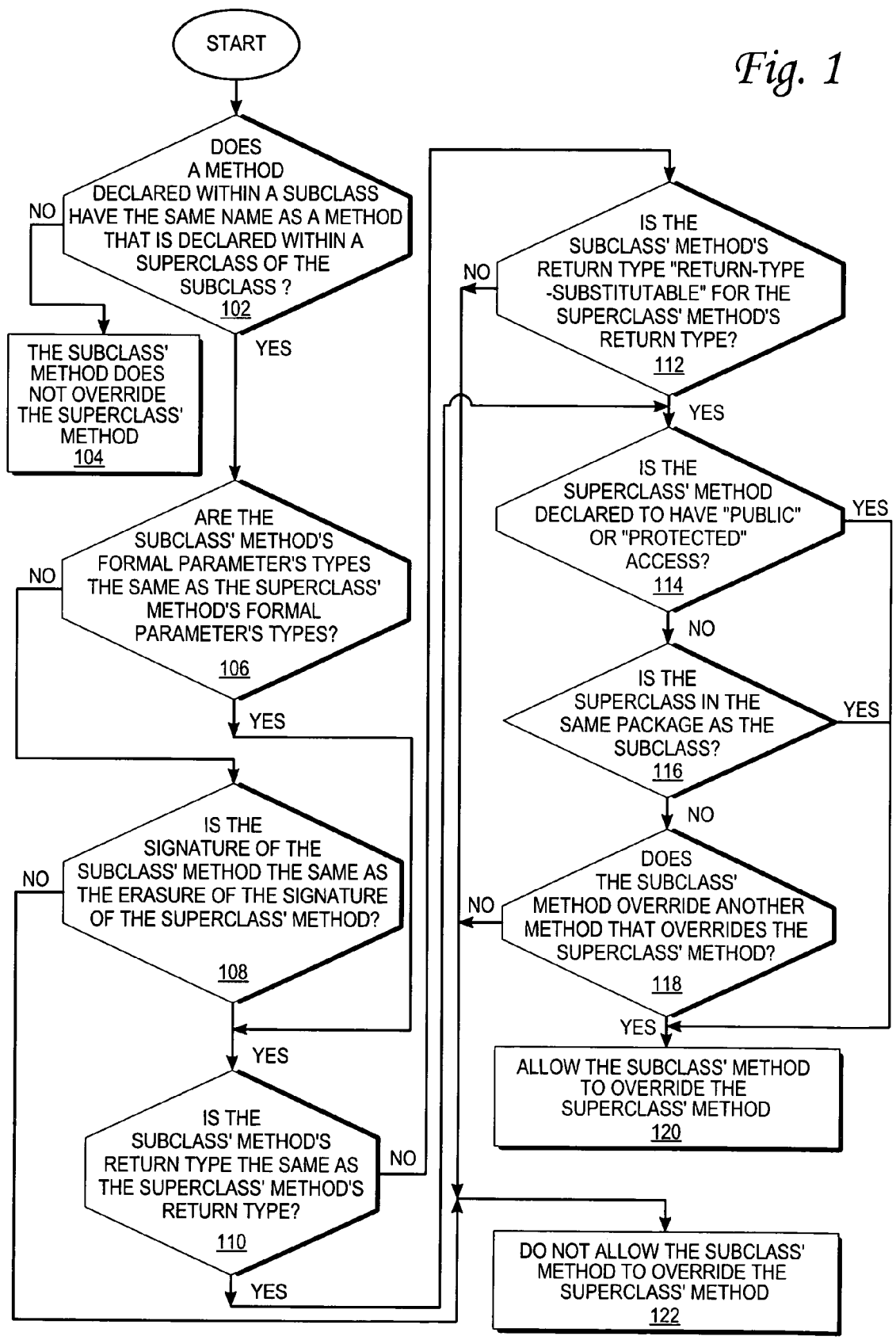
FIG. 1 is a flow diagram that illustrates an overview of the operation of an embodiment of the present invention.

In accordance with one embodiment of the present invention, techniques are provided for allowing a first method to override a second method as long as specified criteria are satisfied, even if the types of the parameters of the first method differ from the types of the parameters of the second method, and even if the return type of the first method differs from the return type of the second method. An operational flow diagram, which illustrates a high level overview of the operation of one embodiment of the present invention, is shown in FIG. 1. Although embodiments of the invention are described below with reference to methods of classes, embodiments of the invention are also applicable to methods of other object-oriented programmatic structures, including interfaces.

Referring to FIG. 1, in block 102, it is determined whether a method declared within a subclass has the same name as a method that is declared within a superclass from which the subclass inherits; that is, the subclass is a "subclass of" the superclass. For example, a compiler may make such a determination at compile time while compiling a program. If the names of the methods are the same, then control passes to block 106. Otherwise, control passes to block 104.

In block 104, the subclass' method does not override the superclass' method. Method override is not a concern regarding these two methods relative to each other, so the compiler may proceed with compiling the program.

Alternatively, in block 106, it is determined whether the types of the formal parameters of the subclass' method are the same as the types of the corresponding formal parameters of the superclass' method. If the two methods do not even have the same number of formal parameters, then the types of the methods' formal parameters cannot possibly be the same. A generic type is not considered to be the same as the corresponding raw type, so, if a formal parameter of one method is of raw type "List" and the corresponding formal parameter of the other method is of generic type "List<Integer>," for example, then the types of the corresponding formal parameters of the methods are not the same. If the types of the corresponding formal parameters are the same, then control passes to block 110. Otherwise, control passes to block 108.

In block 108, it is determined whether the "signature" of the subclass' method is the same as the erasure of the "signature" of the superclass' method. The definition of a method's "signature" is discussed in greater detail below. Prior to certain embodiments of the invention, a subclass' method could not override a superclass' method if those methods' corresponding parameters were of different types—in such cases, the signatures of the method were not the same. This rule prevented a non-generic method from overriding a generified method.

However, according to an embodiment of the invention, if the signature of the subclass' method is the same as the erasure of the signature of the superclass' method, then it is still possible for the subclass' method to override the superclass' method, even if the signatures of the methods differ. Under certain circumstances, this revised rule allows a non-generic version of a method to override a generic version of the same method. Thus, programmers are encouraged to generify their code, and are relieved of the fear that doing so may cause the dependent code of others to become uncompilable due to the generification.

If the "signature" of the subclass' method is the same as the erasure of the "signature" of the superclass' method, then control passes to block 110. Otherwise, control passes to block 122.

In block 110, it is determined whether the return type of the subclass' method is the same as the return type of the superclass' method. Again, a generic type is not considered to be the same as the corresponding raw type. If the return types of the methods are the same, then control passes to block 114. Otherwise, control passes to block 112.

In block 112, it is determined whether the return type of the subclass' method is "return-type-substitutable" for the return type of the superclass' method. The definition of "return-type-substitutable" is described in greater detail below. Prior to certain embodiments of the invention, a subclass' method could not override a superclass' method if those methods had different return types. This rule sometimes prevented a non-generic method from overriding a generified method.

However, according to an embodiment of the invention, if the return type of the signature of the subclass' method is "return-type-substitutable" for the return type of the superclass' method, then it is still possible for the subclass' method to override the superclass' method, even if the return types of the methods differ. Under certain circumstances, this revised rule allows a non-generic version of a method to override a generic version of the same method.

If the return type of the subclass' method is return-type-substitutable for the return type of the superclass' method, then control passes to block 114. Otherwise, control passes to block 122.

In block 114, it is determined whether the superclass' method is declared, in the superclass' declaration, to have "public" or "protected" access. If the superclass' method is declared to have such access, then control passes to block 120. Otherwise, control passes to block 116.

In block 116, it is determined whether the superclass is in the same package as the subclass. If the superclass is in the same package as the subclass, then control passes to block 120. Under such circumstances, the superclass' method may be declared to have default access, for example. If the superclass is not in the same package as the subclass, then control passes to block 118.

In block 118, it is determined whether the subclass' method overrides another method that overrides the superclass' method. In other words, it is determined whether the subclass' method should be able to override the superclass' method due to "transitive method override." Transitive method override is discussed in greater detail in U.S. Pat. No. 6,725,280, U.S. Pat. No. 6,687,760, and U.S. Pat. No. 6,687,759, the contents of each of which are incorporated by reference herein, in their entirety, for all purposes, as though fully and originally disclosed herein. If the subclass' method overrides another method that overrides the superclass' method, then control passes to block 120. Otherwise, control passes to block 122.

In block 120, the subclass' method is allowed to override the superclass' method. As is discussed above, this may be so even if the methods do not have the same signature. The compiler may proceed with compiling the program.

Alternatively, in block 122, the subclass' method is not allowed to override the superclass' method.

In other aspects, the invention encompasses, in certain embodiments, computer apparatuses, computing systems, and computer-readable media configured to carry out the foregoing technique.

A technique for determining whether the signatures of two methods are the same is described below. A technique for determining whether two return types are return-type-substitutable is also described below.

Method Signature

As is discussed above, a subclass' method may override a superclass' method if certain criteria are satisfied. According to one embodiment of the invention, at least one of these criteria is that the signature of the subclass's method needs to be the same as either the signature of the superclass' method or the erasure of the signature of the superclass' method. According to one embodiment of the invention, the "erasure" of a particular method's signature is the same as the particular method's signature in which all generic types, including the types of the particular method's formal parameters and the particular method's return type, have been replaced with corresponding raw types (e.g., "List<Integer>" replaced with "List").

According to one embodiment of the invention, a particular method's signature includes the particular method's name, the argument types of the particular method's formal parameters, and the bounds of the particular method's type parameters. According to one embodiment of the invention, two methods have the same signature if they have the same name and the same argument types. According to one embodiment of the invention, two methods have the same argument types if all of the following are true:

The methods have the same number of formal parameters (which may be zero).
The methods have the same number of type parameters (which may be zero).
Letting $<A_1, \ldots A_n>$ be the formal type parameters of one method and letting $<B_1, \ldots, B_n>$ be the formal type parameters of the other method, after renaming $B_i$ to $A_i$ for all values of i from 1 to n, the bounds of the corresponding type variables and the argument types of the methods are the same.

The signature of a method M1 is called a "subsignature" of the signature of a method M2 if either M2 has the same signature as M1, or the signature of M1 is the same as the erasure of the signature of M2. Thus, according to one embodiment of the invention, a subclass' method is not allowed to override a superclass' method unless the subclass' method's signature is a subsignature of the superclass' method's signature. In such an embodiment of the invention, a subclass' method may be allowed to override a superclass' method even if the subclass' signature is not exactly the same as the superclass' signature, as long as all other specified criteria are satisfied; the difference in signatures alone does not prevent method override.

For example, the following superclass and subclass might exist in code as a consequence of the generification of the superclass ("CollectionConverter") sometime after the codification of the subclass ("Overrider"):

```
Class CollectionConverter {
    <T> List<T> toList(Collection<T> c) { ... }
}
class Overrider extends CollectionConverter {
    List toList(Collection c) { ... }
}
```

In the above example, the "toList( )" method of the superclass is generically typed, but the "toList( )" method of the subclass is not. The types of the parameters of the "toList( )" methods are not identical. The return types of the "toList( )" methods are not identical. Despite these differences, the subclass can still override the superclass. The compiler does not need to issue a terminal error in response to the differences, and the code containing subclass "Overrider" may still successfully compile, even though the "toList( )" method of superclass "CollectionConverter" has been generified since subclass "Overrider" was codified.

Return Type Substitutability

As is discussed above, a subclass' method may override a superclass' method if certain criteria are satisfied. According to one embodiment of the invention, at least one of these criteria is that either the return type of the subclass's method needs to be the same as the return type of the superclass' method, or the return type of the subclass' method needs to be "return-type-substitutable" for the return type of the superclass' method.

Figure 2:
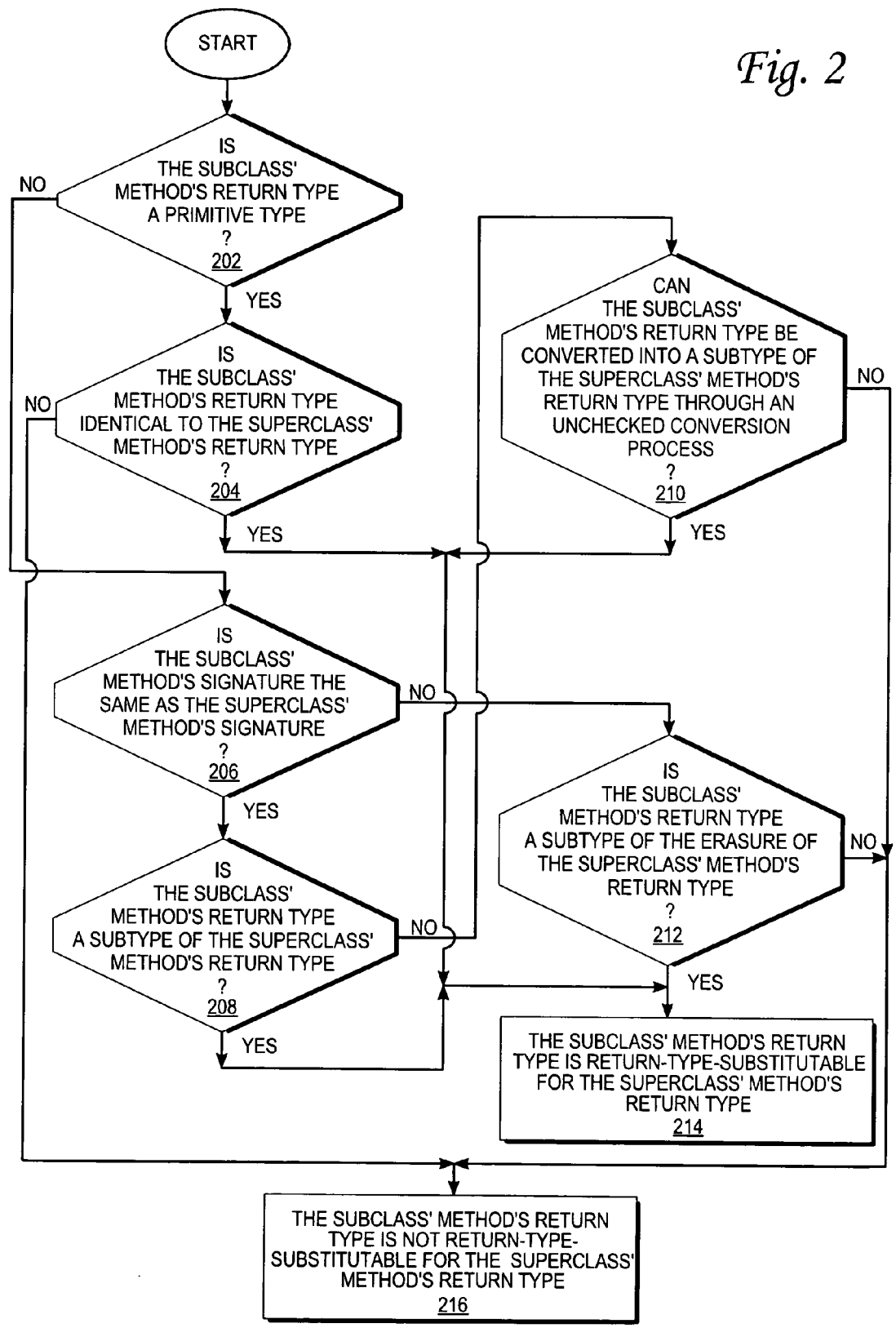
FIG. 2 is a flow diagram that illustrates an example technique for determining whether one method's return type is "return-type-substitutable" for another method's return type, according to an embodiment of the present invention.

FIG. 2 is a flow diagram that illustrates an example technique for determining whether a subclass' method's return type is "return-type-substitutable" for a superclass' method's return type, according to an embodiment of the present invention. A compiler may perform the technique at compile time, for example.

Referring to FIG. 2, in block 202, it is determined whether the subclass' method's return type is a primitive type. If the return type of the subclass' method is a primitive type, then control passes to block 204. If the return type of the subclass' method is not a primitive type, then the return type of the subclass' method is a reference type, and control passes to block 206.

If the subclass' method's return type is a primitive type, then in block 204 it is determined whether the subclass' method's return type is identical to the superclass' method's return type. If the return types are identical, then control passes to block 214. Otherwise, control passes to block 216.

Alternatively, if the subclass' method's return type is a reference type, then in block 206 it is determined whether the subclass' method's signature is the same as the superclass' method's signature. Method signatures are described above. If the signatures are the same, then control passes to block 208. Otherwise, control passes to block 212.

If the methods' signatures are the same, then in block 208 it is determined whether the subclass' method's return type is a subtype of the superclass' method's return type. For example, all types are subtypes of the "Object" type, so if the superclass' method's return type is "Object," then the subclass' method's return type is a subtype of the superclass' method's return type. If the subclass' method's return type is a subtype of the superclass' method's return type, then control passes to block 214. Otherwise, control passes to block 210.

In block 210, it is determined whether the subclass' method's return type can be converted into a subtype of the superclass' method's return type through an unchecked conversion process. According to one embodiment of the invention, the subclass' method's return type can be converted into a subtype of the superclass' method's return type through the unchecked conversion process if the subclass' method's return type is either (a) the same as the erasure of the superclass' method's return type or (b) a subtype of the erasure of the superclass' method's return type. If the subclass' method's return type can be converted into a subtype of the superclass' method's return type through an unchecked conversion process, then control passes to block 214. Otherwise, control passes to block 216.

Alternatively, if the methods' signatures are not the same, then in block 212 it is determined whether the subclass' method's return type is a subtype of the erasure of the superclass' method's return type. If the subclass' method's return type is a subtype of the erasure of the superclass' method's return type, then control passes to block 214. Otherwise, control passes to block 216.

In block 214, the subclass' method's return type is deemed to be return-type-substitutable for the superclass' method's return type. If other criteria are satisfied, then the subclass' method may be allowed to override the superclass' method, despite some disparities between the two. Thus, a subclass' method may be allowed to override a superclass' method even if the return types of the methods differ.

Alternatively, in block 216, the subclass' method's return type is deemed to be not return-type-substitutable for the superclass' method's return type. The differences in return type cause the compiler to prevent the subclass' method from overriding the superclass' method. The compiler may issue an error and terminate compilation.

According to one embodiment of the invention, if the subclass' method's return type is not a subtype of the superclass' method's return type, then an unchecked warning is issued. The compiler may issue such a warning. Such a warning does not halt compilation, but does alert a user that something may be amiss in the program that is being compiled.

According to one embodiment of the invention, if either the subclass' method's return type or the superclass' method's return type is "void" and the other class' method's return type is not "void," then an error is issued and compilation is terminated.

Hardware Overview

Figure 3:
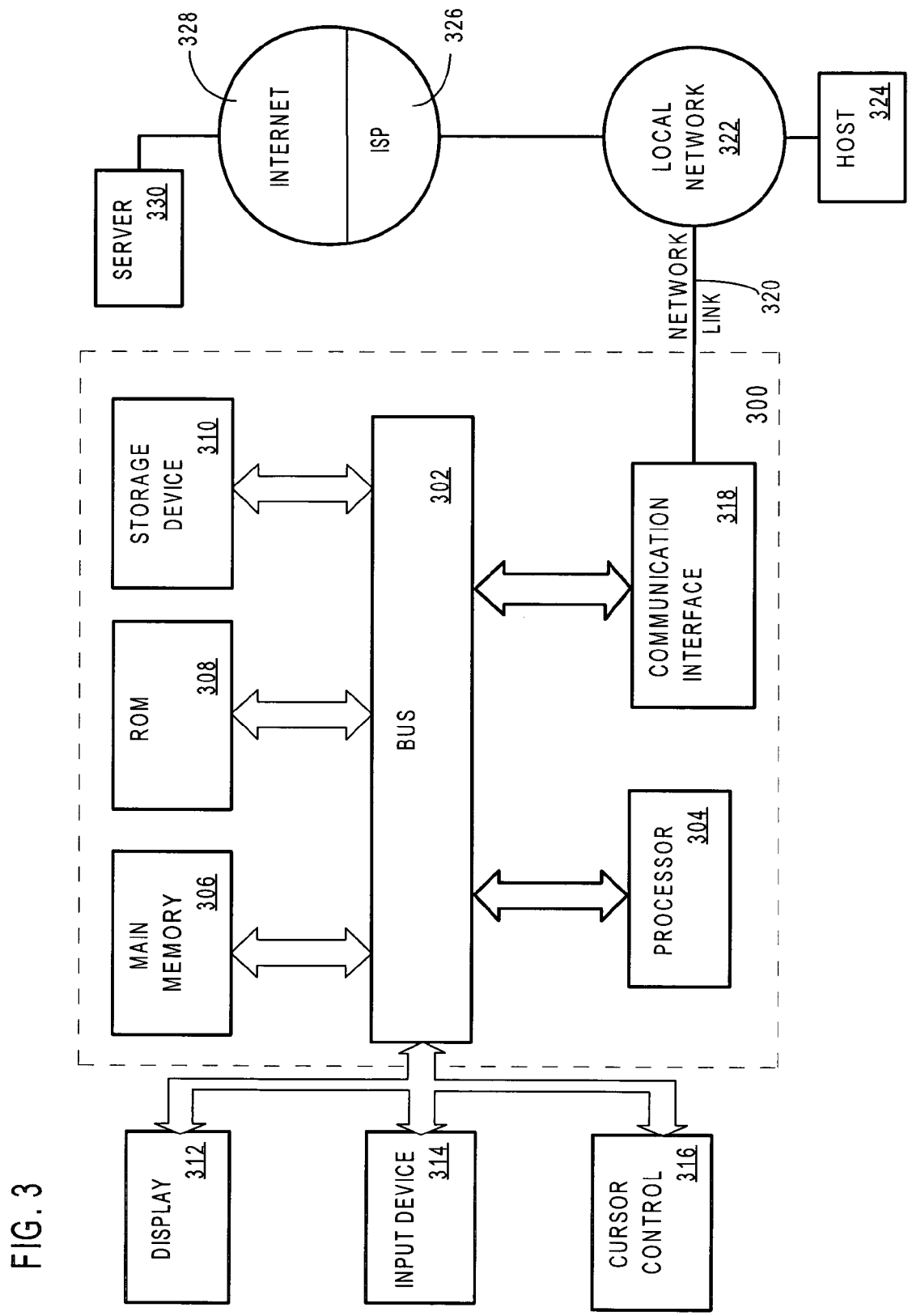
FIG. 3 is a hardware block diagram of an example computer entity, upon which certain embodiments of the invention may be implemented.

FIG. 3 is a block diagram that illustrates a computer system 300 upon which an embodiment of the invention may be implemented. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, signals, data, etc., to be exchanged between the various components. For example, bus 302 may be a set of conductors that carries electrical signals. Bus 302 may also be a wireless medium (e.g. air) that carries wireless signals between one or more of the components. Bus 302 may also be a medium (e.g. air) that enables signals to be capacitively exchanged between one or more of the components. Bus 302 may further be a network connection that connects one or more of the components. Overall, any mechanism and/or medium that enables information, signals, data, etc., to be exchanged between the various components may be used as bus 302.

Bus 302 may also be a combination of these mechanisms/media. For example, processor 304 may communicate with storage device 310 wirelessly. In such a case, the bus 302, from the standpoint of processor 304 and storage device 310, would be a wireless medium, such as air. Further, processor 304 may communicate with ROM 308 capacitively. In this instance, the bus 302 would be the medium (such as air) that enables this capacitive communication to take place. Further, processor 304 may communicate with main memory 306 via a network connection. In this case, the bus 302 would be the network connection. Further, processor 304 may communicate with display 312 via a set of conductors. In this instance, the bus 302 would be the set of conductors. Thus, depending upon how the various components communicate with each other, bus 302 may take on different forms. Bus 302, as shown in FIG. 3, functionally represents all of the mechanisms and/or media that enable information, signals, data, etc., to be exchanged between the various components.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 300, various machine-readable media are involved, for example, in providing instructions to processor 304 for execution. Such a medium may take many forms, including but not limited to, non-volatile media and volatile media, and excluding transmission media. Non-volatile media includes, for example, optical or magnetic disks, such as storage device 310. Volatile media includes dynamic memory, such as main memory 306. Transmission media includes coaxial cables, copper wire, and fiber optic cables, including wires that comprise bus 302.

Common forms of machine-readable media include, for example, a floppy disk, a flexible disk, a hard disk, a magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other physical medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line. Appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-readable medium comprising one or more sequence of instructions stored therein, which instructions, when executed by one or more processors, cause the one or more processors to carry out the steps of:
   determining whether a first method in a first class has a same name as a second method in a second class that is a subclass of the first class;
   in response to a determination that the first method has the same name as the second method, determining, by a compiler, whether each criterion of one or more criteria are satisfied, wherein the one or more criteria include a criterion that an erasure of a signature of the first method is the same as a signature of the second method; and
   allowing, by the compiler, the second method to directly override the first method only when all of the one or more criteria are satisfied,
   wherein the first method is a generified method while the second method is a non-generified method,
   wherein the generified method comprises a parameter is a generic type, and
   wherein the non-generified method does not comprise any parameter being the generic type.

2. The machine-readable medium of claim 1, wherein:
   the first method comprises one or more first type parameters;
   the second method comprises one or more second type parameters;
   the signature of the first method comprises bounds of the one or more first type parameters; and
   the signature of the second method comprises bounds of the one or more second type parameters.

3. The machine-readable medium of claim 1, wherein:
   the one or more criteria include a criterion that the first method is not declared to be private.

4. The machine-readable medium of claim 1, wherein:
   the first method has a first return type;
   the second method has a second return type;
   the one or more criteria include a criterion that the first return type is the same as the second return type whenever the second return type is a primitive type.

5. The machine-readable medium of claim 1, wherein:
   the first method has a first return type;
   the second method has a second return type;
   the one or more criteria include a criterion that each condition in a set of conditions is satisfied whenever the second return type is a reference type; and
   the set of conditions comprises:
      a condition that the second return type is a subtype of an erasure of the first return type whenever the signature of the first method is not the same as the signature of the second method, and
      a condition that, whenever the signature of the first method is the same as the signature of the second method, the second return type is one of: a subtype of the first return type, and a type that can be converted to a subtype of the first return type through an unchecked conversion process.

6. A machine-readable medium comprising one or more sequences of instructions stored therein, which instructions, when executed by one or more processors, cause the one or more processors to carry out the steps of:
   determining whether a first method in a first class has a same name as a second method in a second class that is a subclass of the first class;
   in response to a determination that the first method has the same name as the second method, determining, by a compiler, whether each criterion of one or more criteria are satisfied, wherein the one or more criteria include a criterion that an erasure of a signature of the first method is the same as a signature of the second method; and
   allowing, by the compiler, the second method to directly override the first method only when all of the one or more criteria are satisfied,
   wherein the first method is a generified method while the second method is a non-generified method,
   wherein a return type of the generified method is the generic type, and
   wherein a return type of the non-generified method is not the generic type.

7. The machine-readable medium of claim 6, wherein:
   the first method comprises one or more first type parameters;
   the second method comprises one or more second type parameters;
   the signature of the first method comprises bounds of the one or more first type parameters; and
   the signature of the second method comprises bounds of the one or more second type parameters.

8. The machine-readable medium of claim 6, wherein:
   the one or more criteria include a criterion that the first method is not declared to be private.

9. A computer system comprising:
   a processor;
   a memory;
   instructions, stored in the memory, that when executed by the processor, perform a method, the method comprising:
      determining whether a first method in a first class has a same name as a second method in a second class that is a subclass of the first class;
      determining, by a compiler, in response to a determination that the first method has the same name as the second method, whether each criterion of one or more criteria are satisfied, wherein the one or more criteria include a criterion that an erasure of a signature of the first method is the same as a signature of the second method; and
      allowing, by the compiler, the second method to directly override the first method only when all of the one or more criteria are satisfied,
      wherein the first method is a generified method while the second method is a non-generified method,
      wherein the generified method comprises a parameter is a generic type, and
   wherein the non-generified method does not comprise any parameter being the generic type.

10. The computer system of claim 9, wherein:
    the first method comprises one or more first type parameters;
    the second method comprises one or more second type parameters;

the signature of the first method comprises bounds of the one or more first type parameters; and the signature of the second method comprises bounds of the one or more second type parameters.

11. The computer system of claim 9, wherein:

the one or more criteria include a criterion that the first method is not declared to be private.

12. The computer system of claim 9, wherein:

the first method has a first return type;

the second method has a second return type;

the one or more criteria include a criterion that the first return type is the same as the second return type whenever the second return type is a primitive type.

13. The computer system of claim 9, wherein:

the first method has a first return type;

the second method has a second return type;

the one or more criteria include a criterion that each condition in a set of conditions is satisfied whenever the second return type is a reference type; and the set of conditions comprises:

a condition that the second return type is a subtype of an erasure of the first return type whenever the signature of the first method is not the same as the signature of the second method, and a condition that, whenever the signature of the first method is the same as the signature of the second method, the second return type is one of: a subtype of the first return type, and a type that can be converted to a subtype of the first return type through an unchecked conversion process.

14. The machine readable medium of claim 1, wherein the one or more criteria include a criterion that the return type of the second method is return-type-substitutable for the return type of the first method when the return type of the second method differs from the return type of the first method.

15. The computer system of claim 9, wherein the one or more criteria include a criterion that the return type of the second method is return-type-substitutable for the return type of the first method when the return type of the second method differs from the return type of the first method.

* * * * *

UNITED STATES PATENT AND TRADEMARK OFFICE
CERTIFICATE OF CORRECTION

| | | |
|---|---|---|
| PATENT NO. | : 7,735,070 B2 | Page 1 of 1 |
| APPLICATION NO. | : 11/174073 | |
| DATED | : June 8, 2010 | |
| INVENTOR(S) | : Peter von der Ahe et al. | |

It is certified that error appears in the above-identified patent and that said Letters Patent is hereby corrected as shown below:

In column 2, line 27, delete ""myIntList"" and insert -- "myIntList" --, therefor.

In column 2, line 30, delete ""myIntList.iterator( ).next( )"" and insert -- "myIntList.iterator( ).next( )" --, therefor.

In column 2, line 33, delete "myIntList.iterator( ).next( );" and insert -- myIntList.iterator( ).next( ); --, therefor.

In column 12, line 2, after "including" insert -- the --.

Signed and Sealed this

Second Day of August, 2011

David J. Kappos
*Director of the United States Patent and Trademark Office*